United States Patent [19]

Schoen et al.

[11] 3,941,909

[45] Mar. 2, 1976

[54] PROCESS FOR IMPROVING THE ADHESIVE PROPERTIES OF ETHYLENE-PROPYLENE CO- AND TER POLYMERS

[75] Inventors: Löwhardt A. A. Schoen, Geleen; Franciscus A. Busschers, Spaubeek, both of Netherlands

[73] Assignee: Stamicarbon, B.V., Geleen, Netherlands

[22] Filed: June 19, 1974

[21] Appl. No.: 481,121

[30] Foreign Application Priority Data

June 28, 1973 Netherlands ..................... 7309001

[52] U.S. Cl. ............... 428/424; 156/315; 156/331; 260/858; 260/887; 427/407; 428/516; 428/517
[51] Int. Cl.² ........................................ B32B 27/32
[58] Field of Search ........... 156/331, 315; 117/76 F, 117/72, 138.8 E, 161 KP, DIG. 7; 427/407, 207; 428/424, 516, 517, 523; 260/858, 887

[56] References Cited
UNITED STATES PATENTS

| 3,023,126 | 2/1962 | Underwood et al. ............ 117/76 F |
| 3,198,692 | 8/1965 | Bridgeford .................... 156/331 X |
| 3,502,475 | 3/1970 | Kane ........................... 117/76 F X |
| 3,533,460 | 10/1970 | Kiley ......................... 117/161 KP X |
| 3,582,459 | 6/1971 | Tucker et al. ................. 428/517 X |
| 3,616,193 | 10/1971 | Lubowitz et al. .............. 156/331 X |
| 3,632,393 | 1/1972 | Poppe et al. ..................... 117/72 |

*Primary Examiner*—Ralph Husack
*Attorney, Agent, or Firm*—Cushman, Darby & Cushman

[57] ABSTRACT

A process for improving the adhesive properties of the surface of a body or article derived from co-polymers or terpolymers of ethylene and propylene wherein the surface of the article or body is treated with a primer containing an isocyanate-terminated prepolymer which is the reaction product of a rubber-like, hydroxyl-containing alkadiene-derived polymer and an organic diisocyanate.

8 Claims, No Drawings

PROCESS FOR IMPROVING THE ADHESIVE PROPERTIES OF ETHYLENE-PROPYLENE CO-AND TER-POLYMERS

BACKGROUND OF THE INVENTION

The present invention relates to a process for improving the adhesive properties of surfaces of objects or articles made from copolymers and terpolymers of ethylene and propylene, and in particular to a means for improving the adhesion of paint layers to surfaces of this kind.

As is well known to those skilled in the art objects made from copolymers or terpolymers of ethylene and propylene cannot be easily painted or provided with a lacquer coating because of the insufficient adhesion of the cured layer of paint to the waxy or paraffin-like surface of the materials. It has been found in U.S. Pat. No. 3,607,536 that by first subjecting the surface of such materials to treatment with a sensitizer, such as benzophenone and an organic isocyanate, followed by irradiation with ultraviolet light, the radiation causes an interaction between the isocyanate and the surface substrate thereby providing a surface stratum capable of undergoing strong adhesive bonding. Although the adhesive characteristics of such materials towards lacquer coatings is improved by this technique, the method is objectionable since the need for ultraviolet light requires expensive, special, high-power lamps and radiation chambers.

It has now been surprisingly discovered that it is possible to improve the adhesive properties of a polyolefin surface, in particular towards paint and lacquer without the need for irradiation with light or high-energetic radiation.

SUMMARY OF THE INVENTION

The invention is directed to a process for improving the adhesive properties of the surface of a body or article derived from copolymers or terpolymers of ethylene and propylene wherein the surface of the article or body is treated with a primer containing an isocyanate-terminated prepolymer which is the reaction product of a rubber-like, hydroxyl-containing alkadiene-derived polymer and an organic di-isocyanate.

DETAILED DESCRIPTION OF THE INVENTION

According to the invention a polyolefin surface with improved adhesive properties is readily obtained by applying to such surfaces an isocyanate-terminated prepolymer which is obtained by reacting a rubber-like, hydroxyl-containing alkadiene-derived polymer, with an organic di-isocyanate at a ratio of at least 0.9 moles of di-isocyanate to every mole-equivalent of the hydroxyl groups. If desired, compounds which accelerate the reactions of isocyanates can also be applied with the prepolymer, and the applied layer may also contain one or more compounds which yield free radicals upon heating.

Generally, not more than about 5 moles of di-isocyanate per mole-equivalent of hydroxyl groups are used to prepare the prepolymer and this ratio usually does not exceed 2 and is preferably between about 0.9 and 1.2 and especially between 1.0 and 1.05. During the formation of the isocyanate-terminated prepolymer and/or during the time the wax-like or paraffin-like surface of the ethylene-propylene copolymer or terpolymer is contacted with the prepolymer a solvent may be present, but this is not necessary. Generally, though, a solvent will facilitate contact between the prepolymer and the surface and lead to better results.

After evaporation of any solvent present, and curing of the reaction product, the resultant surface is found to possess improved adhesive properties with respect to paints and lacquers, metals and metal compounds, glues and similar materials such as hot-melt adhesives, printing-ink resins, and the like. Surfaces treated by the process of the invention and conventionally coated with polyurethane-based paints, alkyd resins, modified alkyd resins, acrylate resins, epoxy resins, chlorinated polymers, and the like, result in coatings having excellent adhesion to the primer-coated surface.

The essential component of the primer layer is the reaction product of a rubber-like polymer containing hydroxyl groups derived from an alkadiene, and an organic di-isocyanate, reacted in a ratio whereby there are at least 0.9 moles of diisocyanate per mole-equivalent of hydroxyl groups. In this reaction product of prepolymer, essentially all of the hydroxyl groups on the rubber-like polymer have reacted to give the corresponding —OCONH—R—NCO groups in which R represents the backbone of the di-isocyanate.

The prepolymer may be dissolved, in a concentration of up to about 40% by weight, in an anhydrous organic solvent. Preferably solutions are applied containing from about 1 to 20% by weight of prepolymer. The solution may also contain, besides the prepolymer, one or more conventional compounds which are known to accelerate the reactions of isocyanates, such as tertiary aliphatic amines. In many cases the use of about 0.1 to 2.5% by weight of tri-ethylene diamine has been found to be advantageous. Other teriary amines that can be used include triethylamine, N,N-dimethyl-piperazine, N-ethylmorpholine, and N-methylmorpholine.

The solution may further contain minor amounts of other compounds, such as chlorinated rubber, cellulose derivatives, epoxy resin-forming components, pigments, electrically conductive substances, and the like, provided, of course, their presence does not interfere with the action of the layer of primer.

Very good results are also obtained by including one or more free radical initiators in the solution which yield free radicals when heated, preferably in an amount of about 0.01 to 2% by weight. This makes a further improvement of the bond of the layer of primer possible. Suitable initiators include, among others, organic azocompounds and organic peroxides, for example azobis-isobutyronitrile, benzoylperoxide or lauroylperoxide and the like.

For the solvent, preference is given to the use of a solvent that will properly wet the wax-like surface of the ethylene-propylene copolymer or terpolymer. Preferred solvents are aromatic hydrocarbons, chlorinated aliphatic or aromatic hydrocarbons, or tetrahydrofuran. Especially preferred solvents include trichloroethylene, 1,1,1-trichloroethane, chlorobenzene, benzene, toluene, xylenes and mixtures of these solvents. The solvent may also be a mixture of one or more of the solvents mentioned above with up to about 85% of a solvent having less wetting power with respect to the surface to be treated. The latter class of solvents comprises aliphatic and cycloaliphatic hydrocarbons, ketones, ethers and esters, such as cyclohexane, pentamethylheptane, hexane, methylethylketone, ethylacetate and dioxane.

As mentioned hereinabove, the prepolymer is derived from the reaction product of an organic di-isocyanate and a rubber-like homo- or co-polymer of an alkadiene containing predominantly terminal hydroxyl groups. Examples of typical alkadienes include low molecular weight polybutadiene, styrenebutadiene copolymers and styrene-acrylonitrile copolymers. Polyisoprene or polychloroprene low molecular weight polymers can also be used. Best results are achieved if the rubber-like polymer has a molecular weight of between 500 and 10,000 and, more particularly, a molecular weight of between 1,000 and 5,000. On an average, the rubber-like polymers may contain 1.75 to 5 OH groups per molecule. Preferably, however, polymers are applied containing 2 to 3 OH groups to every molecule.

These hydroxyl-group containing rubber-like polymers are known in the art and are commercially available. In addition, graft polymers of such alkadienes can be used. Thus, polylactone grafts can be added to the hydroxyl groups of a hydroxyl group-containing polybutadiene and the hydroxyl groups with which the organic di-isocyanate later reacts originate from the polylactone grafts. Non-grafted polylactones per se, however, are not usable.

Of the organic di-isocyanates, aliphatic or aromatic di-isocyanate are preferred. Particularly preferred di-isocyanates include hexamethylene di-isocyanate, isophorone di-isocyanate, toluene di-isocyanates, 4,4'-di-isocyanate di-phenylmethane, 1,5-naphthalene di-isocyanate, xylylene di-isocyanate, bitoluene di-isocyanate, and methyl cyclohexylene di-isocyanate. The particular type of di-isocyanate, however, does not have a strong influence on the ultimate adhesive properties.

A minor part of the di-isocyanate may also be replaced by a tri-isocyanate, such as triphenylmethane tri-isocyanate and one skilled in the art can easily establish at what tri-isocyanate concentration the resulting cross-linkage will have a deleterious effect on the ultimate adhesive properties.

The prepolymer may be prepared by preferably reacting the rubber-like polymer containing the hydroxyl groups with the di-isocyanate in a solvent and preferably with heating. Preferably, the amount of di-isocyanate used should provide 0.9 to 1.2 moles of di-isocyanate per mole-equivalent of hydroxyl groups. In most cases, however, a small excess of di-isocyanate can be used, in particular enough to provide 1.02 to 1.05 moles of di-isocyanate per mole equivalent of hydroxyl groups. It will be seen then that the resultant prepolymer will contain no, or at most very little, free hydroxyl groups.

When the prepolymer solution is applied to the rubber surface as a solution, the solvent is first evaporated, generally by allowing the treated substrate to air-dry. The layer of primer is then cured either at ambient temperature or at an elevated temperature, for instance at 50° – 150°C. The curing time also depends upon whether a curing-accelerator is used. When a free radical initiator is used as a curing-accelerator, curing should be carried out at an elevated temperature, above the initiating temperature of the radical source. Curing of the primer layer may also be accomplished after the paint has been applied, the layers of primer and paint being cured simultaneously. If desired, another similar or conventional primer layer may be applied to the layer of primer obtained according to the invention.

The primer layer may be easily applied by conventional techniques, such as spraying, immersion or spreading. As a rule, it is preferred that a solution containing at most 10% by weight of prepolymer be applied first, followed by if necessary, with or without intermediate drying, a more concentrated solution of prepolymer.

The present invention is especially effective for the priming of surfaces made of ethylene-propylene copolymers and, more particularly, for the priming of surfaces of terpolymers of ethylene and propylene with one or more non-conjugated dienes.

Terpolymers of this type are generally known as EPT or EPDM rubbers or elastomers and are generally based on stereospecific linear terpolymers of ethylene, propylene and small amounts of a nonconjugated diene, which can be a cyclic or aliphatic diene. Typical non-conjugated dienes that are used to prepare such terpolymers include 1,4-pentadiene, 2-methyl-1,4-pentadiene, norbornadiene, methylenenorbornene, 1,5-cyclooctadiene, dicyclopentadiene, 1,5-hexadiene, 1,4-hexadiene, 2-methyl-1,5-hexadiene, vinylnorbornene, ethylidenenorbornene, propenylnorbornene. A widely used EPDM elastomer is derived from 65% ethylene, 34% propylene and 2% 1,4-hexadiene. Such polymers may or may not be vulcanized and can be filled or impregnated with oil, carbon black or other substances.

It is preferable that the surface be cleaned and degreased prior to the application of the layer of primer. Although it is not necessary, before the layer of primer is applied, the surface can be roughened and/or treated by corona, UV radiation or the like. If a non-vulcanized rubber is used as the substrate, the primer may be applied by coating the inside of the mould used to prepare the object with the layer of primer prior to vulcanizing the rubber in the mould with the aid of sulphur and/or peroxides.

The following examples are provided to demonstrate the scope of the invention, but should not be construed as limiting it in any way.

EXAMPLE I 100 g of a hydroxyl group-containing styrene-butadiene rubber having a molecular weight of 2,800 – 3,300 and a hydroxyl number of 0.65 mgeq/g (available under the designation CS 15, from Arco Chemical Co, Philadelphia Pa. USA) were dissolved in 300 cc of toluene. To this solution were added 12.2 g of toluene di-isocyanate. The mixture was heated for 1 hour under slight reflux and subsequently cooled. There was thus obtained a solution of 112.2 g of prepolymer in toluene. Using this solution, a solution was prepared containing 5% by weight of prepolymer and 1% by weight of tri-ethylene diamine (DABCO) based upon the weight of the prepolymer.

EXAMPLE II

The procedure of Example I was repeated, using 100 g of a hydroxyl group-containing butadiene acrylonitrile rubber having a molecular weight of about 3,300 – 3,800 and a hydroxyl number of 0.60 mgeq/g (available under the designation CN-15 from ARCO, USA), and 12.4 g of toluene di-isocyanate.

There was thus obtained a 5% by weight solution of the reaction product of the toluene di-isocyanate and the hydroxyl group-containing copolymer of butadiene and acrylonitrile in toluene, to which solution was added 1% by weight of DABCO, based upon the weight of the reaction product.

EXAMPLE III

Following the procedure of Example II, a 5% by weight solution of the reaction product of toluene di-isocyanate and the hydroxyl group-containing copolymer of butadiene and acrylonitrile in toluene was obtained, to which was added instead of DABCO, 1% by weight of α,α-azobis-isobutyronitrile, based upon the weight of the reaction product.

EXAMPLE IV

A mixture of 50 g of a hydroxyl group-containing butadiene-styrene rubber (CS-15 from ARCO), having a hydroxyl number of 0.65 mgeq/g, 50 g of β-caprolactone and 0.01 g of hexabutyldichlorotristannoxate was heated for 3 hours at 150°C with exclusion of oxygen and water. The reaction product was dissolved in 300 cc of toluene, and after the addition of 6.1 g of toluene di-isocyanate, the resultant mixture was heated for 1 hour under reflux. After diluting with toluene and adding (DABCO)-triethylenediamine a solution was obtained containing 5% by weight of prepolymer and 1% by weight — based upon the weight of the prepolymer — of triethylenediamine.

EXAMPLE V 80 parts by weight of a polycaprolactone ester polyol having a molecular weight of approximately 2000 and a hydroxyl number of about 56 mg of KOH/g (available under the designation NIAX-PCP-0240 from the Union Carbide Corp., New York N.Y., USA) were dissolved in 100 ml of toluene. To the solution were added 20.88 g of toluene di-isocyanate and the resulting mixture was heated for 2 hours at about 115°C, with stirring, under moisture-free conditions. A sufficient amount of toluene was then added to the cooled solution to provide a 5% by weight solution of the reaction product. Finally, a 1% by weight of triethylenediamine, based upon the weight of the reaction product, was added to the solution.

EXAMPLE VI

A 5% by weight solution of a polyetherurethane prepolymer containing isocyanate groups, (available under the designation Adiprene L 100 the Du Pont Co., Wilmington Del, USA) having an isocyanate content of about 4.1% and a viscosity at 30°C of approximately 1800 cP was prepared in toluene. To this solution was added 1% by weight of triethylene-diamine, based upon the weight of Adiprene.

EXAMPLE VII

A 5% by weight solution in toluene was prepared from a mixture consisting of the reaction product of toluene di-isocyanate and the hydroxyl group-containing copolymer of butadiene and acrylonitrile, and the remainder, being one third part by weight of the mixture, the triglycidylether of glycerol (available under the name Epikote 812 from the Shell Co. Monston Texas USA).

EXAMPLE VIII

The following rubber compounds were processed into smooth, vulcanized test plates of 2 × 120 × 60 mm, which were applied in the bond tests.

Compound A 100 parts of Keltan-712 (RTM), an EPDM rubber having a Mooney value of 70, (available from DSM. Geleen, the Netherlands, 200 parts of carbon black (SRF-HS), 100 parts of oil (Sumpar 150 from Sun Oil Comp. St. Davids Penna. USA) and the following customary additives comprising 5 parts of zinc oxide, 1 part of stearic acid, 1.5 parts of 2.2' dithio bis (benzothiazol, 0.8 part of tetra methyl thiuram disulfide, 3 parts of ethyl dithio morpholine and 1.5 parts of sulphur.

Compound B 100 parts of Keltan-712 (RTM), 120 parts of carbon black, 40 parts of oil and the additional additives mentioned in compound A.

Compound C 100 parts of Keltan-712 (RTM), 200 parts of carbon black, 100 parts of oil, 5 parts of zinc oxide, 1 part of stearic acid, 1.5 parts of sulphur, and, for non-blooming accelerator system, 1 part of zinc dibutyl dithio carbamate and 0.5 part of 2 mercapto benzothiazol.

Compound D 100 parts of Keltan 520 (EPDM rubber having a Mooney value of 50, from DSM, 70 parts of FEF carbon black, 40 parts of SRF carbon black, 70 parts of oil (Sunthene, from Sun Oil Comp.), 1 part of stearic acid, 2 parts of zinc dibutyl dithio carbamate, 1.5 parts of sulphur, 0.5 part of tetra methyl thiuram disulfide, and 1 part of 2-mercapto benzothiazol. The compounds A and C have a high filler load, and the compounds B and D a low filler load.

The surface of the test strips was cleaned with toluene, xylene or trichloroethane, and the strips immersed in the priming solution. After drying in air for 10 to 20 minutes and after curing at 90° - 100°C for one hour, a thin layer of a flexible moisture-curing polyurethane lacquer was sprayed onto the primer-coated plates (Cuvertin 320, a black high-gloss lacquer available from Henkel & Cie, Duesseldorf BRD). The painted strips were kept for 20 hours at 20°C, and a relative humidity of 50%, and were subsequently cured at 100°C for 20 minutes.

The bond was determined by means of the peeling test according to standard specification ISO-R-36 (angle of peel 180°, peeling rate 10 cm/minute). The peeling tests were performed prior to and after 5 days of immersing the samples in water of 80°C.

The wetting power of the freshly applied priming material on the EPDM sample was judged visually during and after evaporation of the solvent. If after the evaporation a closed layer of primer was present, the wetting was considered good; if open spots were present in the layer of primer, it was considered poor.

The results of the tests employing the different types of primers are summarized in the following Table.

The priming solutions according to the invention are capable of wetting the substrate and form a uniform and even layer of primer. The solutions of polyether- or polycaprolactone-based prepolymers do not properly wet the surface of the substrate and thus do not yield a uniform coating of primer. Therefore no further testing was carried out on these imperfectly coated substrates.

The table shows that the use of a primer according to the invention greatly increases the adhesion of the lacquer to the substrate, giving even good adhesion after several days immersion in water. Peel strengths could only be determined at forces up to about 900 gm/25mm, as the film of lacquer broke when a greater force was used. The peeling test was preferred above other conventional test such as scratching the lacquer with a knife or fingernail or cross-hatching the coating and counting how many small squares can be torn off with the aid of adhesive tape, because even coatings with a low adhesion to the rubber substrate pass such tests.

4. The process of claim 1 wherein the hydroxyl-containing alkadiene-derived polymer is selected from the group consisting of a hydroxyl group-containing polybutadiene, a hydroxyl group-containing co-polymer of butadiene and acrylonitrile, and a hydroxyl group-containing co-polymer of butadiene and styrene.

5. The process of claim 1 wherein the primer contains one or more solvents selected from the group consisting of benzene, toluene, a xylene, tetrahydrofuran, and a chlorinated lower hydrocarbon.

| Type of Primer | Compound A peeling after | | | Compound B peeling after | | | Compound C peeling after | | | Compound D peeling after | | |
|---|---|---|---|---|---|---|---|---|---|---|---|---|
| | 0 days | 5 days | wetting | 0 days | 5 days | wetting | 0 days | 5 days | wetting | 0 days | 5 days | wetting |
| Example I | 2) | | yes | 2) | | yes | 2) | | yes | x | x | yes |
| " II | 765 | 400 | yes | x | x | yes | x | x | yes | x | x | yes |
| " III | x | 870 | yes | x | x | yes | x | x | yes | x | x | yes |
| " IV | 2) | | yes | 2) | | yes | 2) | | yes | x | x | yes |
| " V[3] | 1) | | no | 1) | | no | 1) | | no | 1) | | no |
| " VI[3] | 1) | | no | 1) | | no | 1) | | no | 1) | | no |
| " VII | x | x | yes | x | x | yes | x | x | yes | | | yes |
| no layer of primer | 170 | 30 | | 350 | 0 | | x | 485 | | | | |

1) wetting of the EPDM samples by the primer solutions was so poor that varnishing was abandoned
2) peeling test not conducted
3) comparative examples
x varnish cannot be peeled off

What is claimed is:

1. A process for improving the adhesive properties of a surface of a body derived from copolymers or terpolymers of ethylene and propylene which comprises applying to the surface a layer of a primer containing an isocyannate-terminated prepolymer which is the reaction product of a rubber-like, hydroxyl-containing alkadiene-derived polymer and an organic diisocyanate, wherein the ratio of diisocyanate to every molecequivalent of the hydroxyl groups in the rubber-like polymer is at least 0.9 mole diisocyanate:1 mole equivalent of hydroxyl group.

2. The process of claim 1 wherein the hydroxyl-containing alkadiene-derived polymer is a hydroxyl-containing rubber-like polybutadiene or co-polymer of butadiene having a molecular weight of between 500 and 5,000.

3. The process of claim 2 wherein the polybutadiene or co-polymer of butadiene has a functionality of between 2 and 3.

6. The process of claim 5 wherein the solution also contains 0.01 to 2% by weight of a free radical initiator.

7. A process for coating the surface of an ethylene-propylene co-polymer or a terpolymer derived from ethylene and propylene which comprises: (a) first coating the surface with one or more layers of a primer containing a reaction product derived from a rubber-like hydroxyl group-containing alkadiene derived polymer and an organic diisocyanate wherein the ratio of diisocyanate to every mole-equivalent of the hydroxyl groups in the rubber-like polymer is 0.9 mole diisocyanate:1 mole equivalent of hydroxyl groups, and (b) subsequently applying a layer of a paint of lacquer to the surface as treated in (a).

8. A shaped object derived from co-polymers or terpolymers of ethylene and propylene, the surface of which is coated with a primer layer obtained according to the process of claim 1.

* * * * *